Sept. 9, 1941.  E. G. RATZ  2,255,678
GROUND AND INTERPHASE PROTECTION SYSTEM
Filed March 29, 1940
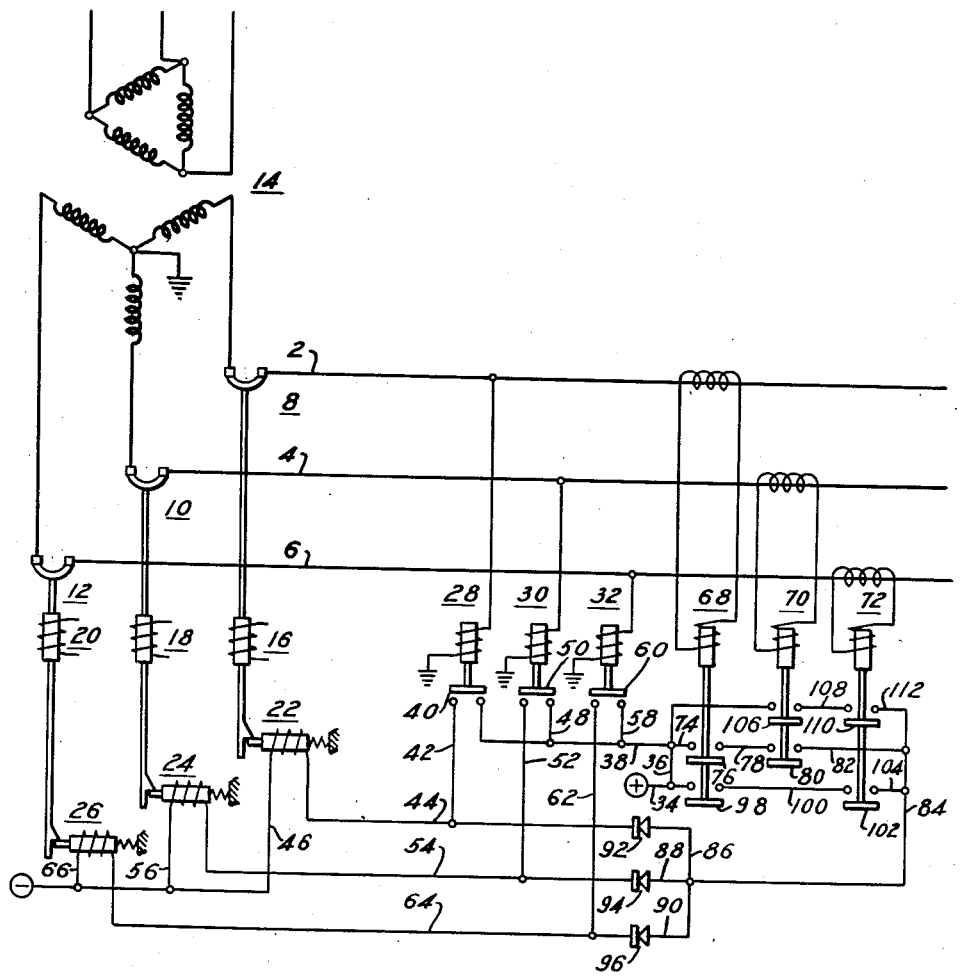
WITNESSES:
N. F. Susan.
Joe Weber.
INVENTOR
Elmer G. Ratz.
BY
D. N. Crawford
ATTORNEY Patented Sept. 9, 1941

2,255,678

UNITED STATES PATENT OFFICE 2,255,678

GROUND AND INTERPHASE PROTECTION SYSTEM

Elmer G. Ratz, Hamilton, Ontario, Canada, assignor to Westinghouse Electric & Manufacturing Company, East Pittsburgh, Pa., a corporation of Pennsylvania Application March 29, 1940, Serial No. 326,718

5 Claims. (Cl. 175—294)

My invention relates, generally, to control systems, and more particularly, to control systems for deenergizing the circuits of polyphase alternating current power systems in response to faults on these circuits.

In the operation of polyphase alternating current systems, and particularly, systems supplying power to synchronous machinery, it has been found desirable, when a ground fault occurs on one of the conductors, to deenergize only the conductor on which the ground occurs, thus leaving the remaining conductors energized to maintain synchronism of the connected machinery.

An object of my invention is to provide a control system for polyphase alternating current power systems which shall function to deenergize only the conductor upon which a ground fault occurs when such ground fault is present on the system.

A further object of the invention is to provide a control system for an electrical power distribution system which shall function in response to ground faults to disconnect only the conductor or conductors on which the fault occurs, and which shall function to disconnect all of the conductors when a conductor-to-conductor fault occurs on the system.

Another object of the invention is to provide a control system for an electrical power distribution system which shall function to selectively isolate the conductors of the system in response to faults on the system, which shall be simple and efficient in operation, and which shall be inexpensive to manufacture, install, operate, and maintain.

These and other objects and advantages of the invention will be apparent from the following detailed description taken in connection with the accompanying drawing, in which the single figure is a diagrammatic representation of a power system embodying the principal features of the preferred embodiment of my invention.

In practicing the invention, individually controlled circuit breakers are provided for the separate conductors of a power distribution system. Ground relays are provided for selectively energizing the individual tripping mechanisms of the circuit breakers, and other relays are provided for energizing the several tripping mechanisms when a conductor-to-conductor fault occurs.

Referring to the drawing for a more detailed description of the invention, the conductors 2, 4 and 6 of a three-phase transmission or distribution circuit are connected by circuit breakers 8, 10 and 12, respectively, to the phase windings of any suitable grounded three-phase source of alternating current power, such as a transformer 14. The circuit breakers 8, 10 and 12 have any suitable closing means such as solenoids 16, 18 and 20 and electromagnetic tripping devices 22, 24 and 26, respectively.

Ground responsive or detecting devices such as ground relays 28, 30 and 32 are connected to the conductors 2, 4 and 6, respectively. These devices may be any suitable type and are shown herein for the purpose of illustration as relays having back contacts which are closed when a ground fault on any of the conductors 2, 4 and 6 reduces the potential between the conductor and ground. The ground relays 28, 30 and 32 are connected to selectively trip the circuit breakers 8, 10 and 12, respectively, by energizing their tripping devices 22, 24 and 26, respectively.

The contact element of the relay 28 is connected to control the trip device 22 in a circuit which extends from the positive terminal of any suitable source of electrical control power through the conductors 34, 36 and 38, contact element 40 of the relay 28, conductors 42 and 44, the winding of the trip device 22, and conductor 46 to the negative terminal of the source of power.

A similar circuit is provided for controlling the tripping device 24 of the circuit breaker 10 with the ground relay 30; this circuit extends from the positive terminal of the source of control power through the conductors 34, 36, 38 and 48, the contact element 50 of the relay 30, conductors 52 and 54, the winding of the trip device 24, and conductors 56 and 46 to the negative terminal of the source of control power.

Similarly the ground relay 32 controls the trip device 26 of the circuit breaker 12 through a circuit which extends from the positive terminal of the source of control power through the conductors 34, 36, 38 and 58, the contact element 60 of the relay 32, conductors 62 and 64, the winding of the trip device 26, and conductors 66 and 46 to the negative terminal of the source of control power. Thus, it will be seen that the circuit breakers 8, 10 and 12 may be individually selectively controlled by the ground relays 28, 30 and 32, respectively, in response to ground faults occurring on any of the conductors 2, 4 or 6.

Current responsive overload relays 68, 70 and 72 are connected to respond to excessive current flow in the conductors 2, 4 and 6, such as would be caused by a fault on any of these conductors. Any other suitable type of relay may be used for this purpose. The contact elements of the relays 68, 70 and 72 are connected to energize a control circuit for the tripping devices 22, 24 and 26 when a fault occurs on any two of the conductors 2, 4 and 6 simultaneously.

A simultaneous overload on two of the conductors 2, 4 and 6 will exist when a phase-to-phase fault occurs on the power system. When a phase-to-phase fault occurs on the conductors 2 and 4, for instance, the relays 68 and 70 will be energized and their contact elements will complete a circuit for the tripping devices 22, 24 and 26 simultaneously, which circuit extends from the positive terminal of the source of control power through the conductors 36 and 74, contact element 76 of the relay 68, conductor 78, contact element 80 of the relay 70, conductors 82 and 84 to the branch circuit comprising conductors 86, 88 and 90 which are electrically connected to the aforementioned trip circuit, and conductors 44, 54 and 64 through rectifier elements 92, 94 and 96. The common tripping circuit for the tripping devices 22, 24 and 26 may also be completed through the circuit between conductors 34 and 84 by the relays 68 and 72. The circuit between the conductors 34 and 84 extends through the contact element 98 of the relay 68, a conductor 100, the conduct element 102 of the relay 72, and the conductor 104 to the conductor 84. Similarly the common tripping circuit may be completed by the actuation of the relays 70 and 72, simultaneously, this circuit extending from the conductor 34 through the conductor 36, contact element 106 of the relay 70, conductor 108, contact element 110 of the relay 72, and conductor 112 to the conductor 84.

It will be noted that with the rectifiers 92, 94 and 96 connected between the interconnected conductors 86, 88 and 90 and the conductors 44, 54 and 64, respectively, the ground relays 28, 30 and 32 can selectively energize the tripping devices 22, 24 and 26, the rectifiers 92, 94 and 96 preventing current flow between the tripping circuits controlled by the relays 28, 30 and 32, and at the same time these rectifiers permit current flow from the common tripping circuit controlled by the overload relays 68, 70 and 72 to simultaneously actuate all of the tripping devices 22, 24, and 26 when a phase-to-phase fault occurs on any two of the conductors 2, 4 and 6.

With the system operating as hereinbefore described, it will be seen that, with the occurrence of a ground on only one of the conductors 2, 4 or 6, only its associated circuit breaker will trip and synchronism of any synchronous devices on the power line may be maintained through the remaining power conductors until the tripped circuit breaker is again reclosed. To facilitate such operation, any suitable control system for the circuit breakers 8, 10 and 12 may be provided for immediately reclosing any circuit breaker tripped by a ground fault.

It is to be understood that the ground relays 28, 30 and 32 may be any type of relay that is suitable to function in response to ground faults on the power conductors.

It will be seen that I have provided a control system for a power transmission or distribution system which will function to selectively isolate power conductors on which ground faults occur and to simultaneously isolate all the conductors on the occurrence of any phase-to-phase faults, which shall be simple and efficient in operation and shall be inexpensive to manufacture, install, and maintain.

In compliance with the requirements of the patent statutes, I have shown and described herein a preferred embodiment of my invention. It is to be understood, however, that the invention is not limited to the precise construction shown and described, but is capable of modification by one skilled in the art, the embodiment herein shown being merely illustrative of the principles of my invention.

I claim as my invention:

1. In a control system for a power circuit comprising a plurality of conductors, a circuit breaker for each of the conductors, a tripping device for each of the breakers, means responsive to ground faults on the conductors for actuating the tripping device of the circuit breaker for the conductor on which the fault occurs, and means responsive to conductor-to-conductor faults for actuating a plurality of said tripping devices.

2. In a control system for a normally-grounded polyphase power distribution system having a circuit control device for each of the phase conductors, separate means associated with each of the circuit control devices for causing the circuit control device to open its associated phase conductor circuit, means associated with each of the phase conductors responsive to a ground fault on its associated conductor for actuating the circuit opening means associated with that conductor, and means responsive to phase-to-phase faults for actuating a plurality of said circuit opening means.

3. In a control system for a power distribution system having a plurality of conductors, individual means for open-circuiting each of the conductors, a control circuit for each of said open-circuiting means, means associated with each of the conductors and responsive to ground faults on its associated conductor for completing the control circuit for the open-circuiting means of its associated conductor, other circuit means for simultaneously completing a plurality of said control circuits, and means responsive to phase faults on the conductors for completing said other circuit means.

4. In a control system for a power distribution system having a plurality of conductors, a circuit breaker having an individual tripping means for each of the conductors, a separate circuit for each of said tripping means, a ground relay associated with each of the conductors for completing the tripping circuit of the circuit breaker associated with the conductor, conductor means interconnecting said tripping circuits, current valve means for permitting current flow in only one direction between said conductor means and said tripping circuits, other relay means responsive to phase faults on the conductors for completing an auxiliary control circuit, the auxiliary control circuit being connected to said interconnecting conductor means thereby to simultaneously energize the several tripping means.

5. In a control system for a normally-grounded polyphase power-distribution system, a circuit breaker for each of the phase conductors of the system, a tripping circuit for each of the circuit breakers, a ground relay associated with each of the conductors and responsive to a ground fault on the associated conductor, means whereby each ground relay operates to complete the tripping circuit of the circuit breaker for the conductor with which the relay is associated, circuit means connecting each of said tripping circuits to a common conductor, electric valve means disposed to prevent current flow between said tripping circuits, other relay means responsive to phase-to-phase faults on the conductors, and a circuit controlled by said other relay means and connected to said common conductor whereby all of said tripping circuits are completed upon the actuation of said other relay means.

ELMER G. RATZ.